Sept. 13, 1960  C. H. O. BERG  2,952,357
SOLIDS ELUTRIATION APPARATUS
Filed Nov. 3, 1955
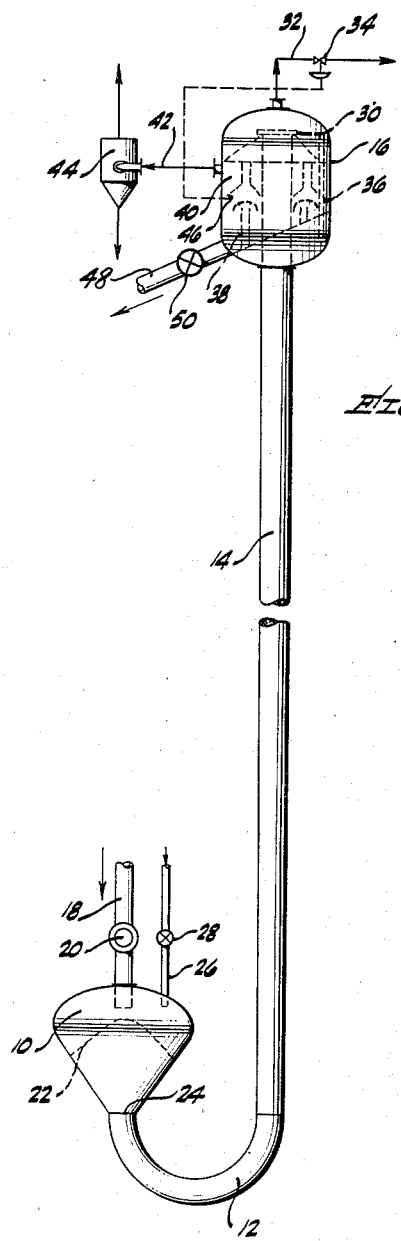
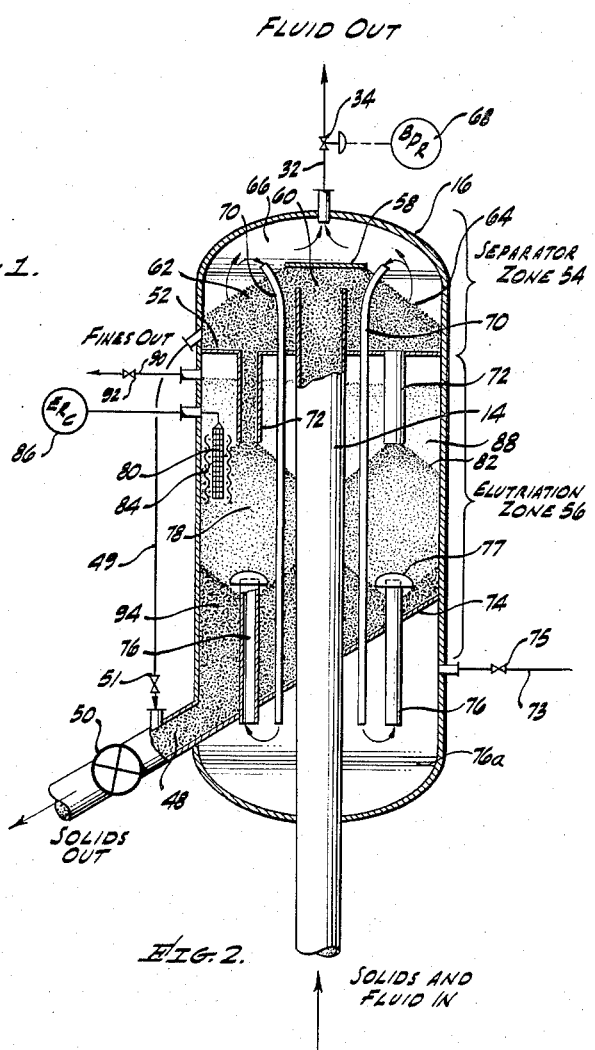
INVENTOR.
CLYDE H. O. BERG,
BY
ATTORNEY.

Patented Sept. 13, 1960

2,952,357

SOLIDS ELUTRIATION APPARATUS

Clyde H. O. Berg, Long Beach, Calif., assignor to Union Oil Company of California, Los Angeles, Calif., a corporation of California Filed Nov. 3, 1955, Ser. No. 544,680

9 Claims. (Cl. 209—138)

This invention relates broadly to an improved method and apparatus for the conveyance of granular solids and relates specifically to an improvement whereby solid fines may be continuously removed from the moving mass of solids under conditions of accurate control as to the size of particles removed and to the minimum size of solid particles remaining in the moving stream.

A considerable number of processes now involve the continuous movement, conveyance, and recirculation of large quantities of granular solids of varying degrees of fineness at high rates, some approaching 1,000 tons per hour. Among the examples of such operations are included the Fluid Catalytic Cracking (F.C.C.) and other fluidized solids processes, those processes involving moving beds of granular solids including those in which the solids are relatively noncatalytic such as the various thermal coking and cracking operations as well as those in which the solids are catalytic as in the Thermofor Catalytic Cracking (T.C.C.) process, continuous catalytic reforming processes, catalytic desulfurization processes and continuous gas separation processes involving selective adsorption of gaseous constituents on a granular adsorbent.

In all of these processes relatively large quantities of granular solids are passed through treating vessels and recirculated at relatively large flow rates. Invariably, due to abrasion and attrition and perhaps impact of one solid particle against another, the solid particles are slowly reduced in size with the formation of solid fines. These are often undesirable in the process since they exert a detrimental effect upon fluid-solids contact operations. Perhaps the most well known detrimental effect attributed to the presence of solids fines in fluid-solids contact operations is that of channelling. The fines tend to accumulate in the interstices between the solid particles thereby increasing the fluid pressure drop through that part of the mass of granular solids. The flowing fluid naturally will follow the course of least resistance which is that where the pressure drop is the least and where the concentration of the solids fines in the mass of solid particles is the least. The results of such channelling are well known, the foremost of course being poor contact of fluid with the solids and this means in catalytic processes poor utilization of the catalytic ingredient, ineffective conversion or treatment by the catalyst as part of the fluids pass through, and low quality products.

Fines also exert a serious effect upon catalyst regenerations in which channelling through a mass of moving catalyst or other granular solids being regenerated causes incomplete regeneration of a certain proportion of the solids. Such partial regeneration is reflected in decreased conversion in the reaction part of the process.

It is therefore a primary object of this invention to provide in processes which involve the continuous movement of solid granular particles an improvement whereby solids fines may be continuously and controllably removed from the system to minimize or eliminate the above identified detriments.

It is an additional object of this invention to provide an improved process for the conveyance of granular solids which permits a continuous control over the particle size of the smallest particles remaining in the moving system.

An additional object of this invention is to provide a process for the continuous elutriation of the circulating stream of solids utilized in continuous cyclic fluid-solids contact processes.

Another object of this invention is to provide an improved process for solids conveyance in which the solids are moved in compact form at substantially their static bulk density concurrently with a depressuring lift fluid, either liquid or gaseous, through a lift line or conduit at the end of which the solids are discharged into an expanded bed of solids wherein solids fines of controllable size are continuously elutriated from the mass of large particles.

A specific object of this invention is to provide an improved process for the elutriation of granular solids conveyed as above indicated and in which the conveyance fluid is employed as the elutriation fluid following the conveyance.

An additional object of the present invention is to provide an apparatus for the continuous conveyance and elutriation of granular solid particles and to accomplish the other aforementioned objects.

Other objects and advantages of this invention will become apparent to those skilled in the art as the description thereof proceeds.

In this specification, reference to granular solids as being in "substantially compact form" is meant to denote a bulk density of the solids under the prevailing conditions which is substantially equal to the static bulk density of the solids when unaerated and at rest as hereinafter more fully defined.

Briefly, the present invention comprises an improved process for the conveyance and elutriation of granular solids in which the solids are moved through a conduit concurrently with a depressuring lift gas under controlled conditions of operation whereby the bulk density of the granular solids thus conveyed is substantially the same as the static or at-rest bulk density. The solids are thus conveyed to the end of the conduit at which point a compressive force is applied to the solids issuing from the lift line whereby the solids are maintained in substantially compact form during conveyance. The solids are subsequently contacted with an elutriation gas at such a rate and at such a lineal velocity that a relatively small and controllable change in the bulk density of the solids is effected forming an "expanded bed" of solids. The discharging granular solid particles pass through this expanded bed of solids which is maintained at an average bulk density somewhat less than the static bulk density. The degree of expansion of the bed of solids is controlled between relatively narrow limits which have been found to cause a classification of the solid particles according to size and in which the larger particles gravitate to the lower regions of the expanded bed and the solids fines accumulate at the top. All, or only a portion, of the solids discharging from the lift line may thus be elutriated depending upon the allowable quantity of solids fines present and the rate at which they are formed. The solids fines are continuously withdrawn at a controlled rate from above the top of the expanded bed zone while the elutriated fines-free solids are discharged from the bottom of the expanded bed or elutriation zone.

To accomplish this type of conveyance and to prevent the granular solids from being fluidized or suspended in the conveyance conduit, several essential requirements must be met. These several requirements are briefly discussed below.

The elongated conveyance zone or conduit is provided with a zone or means for submerging its inlet opening in a dense mass of solids to be conveyed. This solids accumulation is maintained by adding solids to be conveyed to the accumulation at a rate substantially equal to the rate at which the solids are being conveyed in those instances in which the granular solids are being conveyed continuously. In batch-wise conveyance processes, this accumulation may constitute a reservoir of solids to be conveyed and the conveyance is continued so long as the accumulation of solids submerges the inlet opening. In either case, the inlet opening of the conveyance conduit is submerged in and below the level of a moving dense mass of granular solid material in this type of conveyance.

The elongated conveyance zone is maintained completely full of solids in the form of a dense, fluid-permeable mass of granular solids which moves through the conveyance zone from the accumulation submerging its inlet. The forces tending to resist movement of the mass of solids present in the conveyance zone are overcome and a positive force in the desired conveyance direction is generated throughout the length of the conveyance zone by passing a controlled flow of conveyance fluid through the interconnected interstices of the fluid-permeable solids mass. The forces tending to resist solids flow are primarily those of gravity and of friction against the inside walls of the conveyance zone. The resisting force of gravity is equal to $\rho_s \cos \theta$, wherein $\rho_s$ is the bulk density of the solids mass in pounds per cubic foot and $\theta$ is the angular deviation of the conveyance direction from a vertical upward reference axis. The operating pressures at the inlet and the outlet of the conveyance zone are adjusted so as to maintain a flow of fluid concurrently with the solids at a value sufficient to generate a pressure gradient $$\frac{dp}{dl}$$

in pounds per square foot per foot throughout the length of the conveyance zone which exceeds the value of $\rho_s \cos \theta$. This is the conveyance force which overcomes the opposing force of gravity and which also overcomes the opposing frictional forces when the pressure gradient is sufficiently greater than the gravitational forces. The ratio of the conveyance force to the opposing gravitational force is $$\frac{\frac{dp}{dl}}{\rho_s \cos \theta}$$

and this is the conveyance force ratio. The conveyance fluid flow is maintained at a sufficiently high rate so that the conveyance force ratio throughout the conveyance zone is greater than 1.0. The amount by which the ratio exceeds 1.0 is controlled at a value between about 1.01 and about 2.0 or more, values in this range generally being sufficient to also overcome the opposing frictional forces. This generates within the conveyance zone a conveyance force sufficient to permit solids movement in the form of a dense mass so long as the other essential requirements are met.

In order to maintain the moving solids in the form of a dense compact mass during conveyance, a flow restriction or thrust force is applied at the outlet of the conveyance zone against the mass of discharging solids. This may be done by discharging this mass of solids against a thrust plate or wire mesh disposed just opposite the outlet opening of the conveyance zone, or discharging this solids mass against the roof or wall of a solids receiving zone, or by controlling the rate of withdrawal of discharged solids from such a solids receiving zone so as to maintain another accumulation of compact solids which deeply submerges the outlet opening of the line. In any event a means for controlling the rate of withdrawal of discharged solids from around the outlet opening of the conveyance zone is provided. When the thrust plate or wire mesh or other means are provided, the depth of discharged solids above the outlet is ordinarily less than when the bed is allowed to build up and supply the thrust force. In any event the mass of discharging solids reverses its direction at the outlet of the conveyance zone, flows downwardly by gravity in the form of a moving solids accumulation and then passes through some solids flow control means. This restriction applied against the discharging mass of solids serves to keep the solids in the form of a dense compact mass and to prevent solids suspension or fluidization in the conveyance conduit. It exerts however substantially no restriction against the flow of conveyance fluid.

The foregoing are the essential requirements for the conveyance of granular solids in the form of a continuous moving dense mass.

The apparatus involved in effecting the briefly described invention includes an induction zone into which the unelutriated solids are passed, a lift line or lift conduit opening into the induction zone and terminating inside the induction zone at a point adjacent the bottom thereof, means for introducing a lift fluid under pressure into the induction zone, a combination separator and elutriator zone into which the opposite extremity of the lift line opens, means for restricting the discharge opening of the lift line to maintain the solids therein in substantially compact form, means for flowing the granular solids from the separator zone to the elutriation zone, means for passing an elutriation fluid upwardly through the solids maintained in the elutriation zone, means for continuously withdrawing solids fines separated from the upper part of an expanded bed of solids maintained in the elutriation zone, and means for discharging elutriated fines-free granular solids from the elutriation zone.

The compact mass of granular solids conveyed as described above is discharged into a solids receiving and elutriation zone or chamber in which the mass of solids is treated to separate solids fines. The solids receiving and elutriation vessel according to this invention is provided intermediate its ends with a transverse horizontal divider forming a separator zone above and an elutriation zone below. The lift line or lines extend into the separator zone and a thrust plate is provided adjacent the discharge opening as shown in Figures 1 and 2. A nonexpanded mass of solids forms in the separator zone wherein the lift gas and solids are separated. A lift gas downcomer tube is provided extending through the transverse divider as well as through a lower inclined baffle traversing the elutriation zone. These downcomer tubes carry at least part of the separated lift gas from the separator zone into the zone below. An outlet tube, generally controlled by a back pressure regulator, is provided to remove any remaining lift gas. Solids pass through tubes depending from the transverse divider and flow thereby from the separator zone into the elutriation zone which extends to the inclined baffle. The elutriation gas comprises the lift gas conducted through the downcomer from the separator zone plus any additional elutriation gas which may be added as required. Where the elutriation apparatus is situated in the top of a treating vessel such as in selective adsorption, a process gas therefrom may be at least partly utilized as elutriation gas. A valve and line are provided to either remove excess process gas or introduce additional elutriation gas from or into said elutriation zone. The elutriation gas causes the formation of an "expanded bed" of solids in the elutriation zone and the accumulation of a fluidized suspension of separated fines adjacent the expanded bed as shown and described in Figures 1 and 2. The fines are drawn off via a line and control valve from the part of the elutriation zone above the inclined baffle while the elutriation gas is introduced into the elutriation zone from below this baffle. A valve and line are provided for withdrawing elutriation gas from that part of the elutriation vessel above the inclined baffle. The rate of elutriation gas flow is controlled by the degree of bed expansion whereby a movable grid as shown in Figure 2 detects changes in the bulk density of the expanded bed and varies the flow rate of elutriation gas accordingly to maintain a predetermined degree of expansion or a predetermined bulk density in the elutriated fines-free granular solids from the elutriation zone.

The process and apparatus of the present invention briefly described above will be more clearly understood from the following description of the accompanying drawings showing the various parts of the conveyance and elutriation apparatus of this invention and in which:

Figure 1 shows the conveyance process and apparatus of the present invention in which the provisions for fines elutriation are made, and Figure 2 is a detailed elevation view in cross section of the solids receiving and elutriation chamber in which the elutriation method of this invention is effected.

Referring now more particularly to Figure 1, the apparatus of this invention comprises induction zone 10, return bend zone 12 connected in solids receiving relation to chamber 10, and an elongated conveyance conduit or zone 14 provided at its upper end with solids receiving and elutriation vessel 16. Granular solids containing some fines are introduced through line 18 controlled by means 20 into induction chamber 10 forming solids accumulation 22. This accumulation submerges the solids inlet opening 24 to the return bend portion of the conveyance conduit. Means 20 may comprise either a valve or a solids feeder of the type recently developed which permits the substantially continuous downflow of solids against a pressure differential without little or not counterflow of fluid. The conveyance fluid, which may be either gaseous or liquid, flows into induction chamber 10 through line 26 controlled by valve 28.

The conveyance fluid under pressure and the granular solids from accumulation 22 flow concurrently through inlet opening 24 and through return bend 12 upwardly through conveyance conduit 14 into solids receiving and elutriation chamber 16. During this transfer the granular solids are moved by means of the pressure or force gradient generated at all points throughout the elongated rising mass of solids due to the concurrent conveyance fluid flow. The mass is maintained substantially at the solids' static bulk density by discharging it against thrust plate 30 in the upper or separation zone of chamber 16. The depressured conveyance fluid is disengaged from the conveyed solids and may be removed from chamber 16 through line 32 at a rate controlled by valve 34. At least part of the granular solids move downwardly by gravity into the lower or elutriation zone in chamber 16 wherein they are countercurrently contacted by part of the conveyance fluid as an elutriation fluid, while the remainder may be by-passed directly to solids outlet 48 through line 49 controlled by valve 51 as shown in Figure 2. At least part of the disengaged conveyance fluid flows downwardly through downcomer conduit 36 into the lower part of chamber 16 from which it flows upwardly through risers 38 at a rate sufficient to maintain the above described expanded bed of solids. The suspended fines and the conveyance fluid are removed from disengaging zone 40 through line 42 and are treated for fines separation in separator 44. The rate at which the lift gas flows upwardly through the elutriation zone in this modification may be controlled by the rate at which the conveyance fluid is removed through line 32. Thus solids density detector 46 may be made to actuate valve 34 so as to maintain a predetermined degree of solids bed expansion.

The elutriated solids, now having a substantially reduced solids fines content, are removed by gravity from the bottom of solids receiving chamber 16 through line 48 at a rate controlled by valve 50.

If this process and apparatus is to be utilized in a recirculatory solids process then solids inlet 18 and solids outlet 48 are appropriately connected to a vessel or vessels through which solids circulation is to be maintained.

The conveyance fluid required in the process of the invention thus performs a double duty in conveying the solids as well as in elutriating solids fines therefrom and no separate elutriation gas and treating and handling facilities therefor are required.

Referring now more particularly to Figure 2 a vertical cross section of solids receiving and elutriation chamber 16 is shown. The elutriation vessel 16 is provided intermediate its ends with a transverse horizontal divider 52 forming a separator or solids receiving zone 54 above and an elutriation zone 56 below. The lift line or lines 14 extend into the separator zone 54 and a thrust plate 58 is provided adjacent the discharge opening 60 of conveyance conduit 14. A nonexpanded mass of solids 62 is formed and maintained below thrust plate 58 and surrounding the upper portion of conveyance zone 14 in which the mass of solids reverses flow direction and passes downwardly by gravity through separator zone 54 forming an upper solids-fluid level or interface 64. Through this interface the conveyance fluid discharging through outlet opening 60 with the solids is disengaged and enters vapor space 66. A portion of this lift gas may be removed therefrom through line 32 at a rate controlled by valve 34 and it may be controlled by back pressure regulator 68.

The remaining portion of conveyance fluid, or all of it, flows from vapor space 66 downwardly as the elutriation fluid through fluid downcomers 70 and through a lower inclined baffle 74 traversing the elutriation zone at a point below the transverse horizontal divider 52. The subsequent use of this portion of the conveyance fluid is described below.

Granular solids flow by gravity through solids downcomers or sealing legs 72 and are discharged at an intermediate point in elutriation zone 56. Since the granular solids flowing through downcomer 72 are in compact form they present a high resistance to the flow of fluids concurrently therewith from separator zone 54. A minor portion of the fluid however does flow through these downcomers generating a pressure differential which forces the major portion of the conveyance fluid downwardly through fluid downcomer 70 and into the elutriation zone.

The solids pass downwardly from the outlets of downcomers 72 through the intermediate portion of elutriation zone 56 in which the solids are maintained as a nonfluidized expanded solids bed having a bulk density between about 1 percent and about 25 percent less than the static bulk density of the solids, or the bulk density of the solids moving in separator zone 54 and in lift line 14. This reduced density is maintained as indicated previously by passing the elutriation gas from elutriation gas header zone 76a, together with additional elutriation gas if required, introduced thereinto through line 73 at a rate controlled by valve 75, upwardly through elutriation gas risers 76 and into the bottom of the intermediate portion of elutriation zone 56 in which the expanded solids bed is maintained. Caps 77 are provided to prevent solids downflow through the risers. The intermediate portion of the elutriation zone is thus defined as that part between the lower outlet openings of downcomers 72 and the upper outlet openings of elutriation gas risers 76. Herein the expanded solids bed 78 is maintained and the fines are elutriated therefrom.

The degree of expansion in expanded bed 78 is detected by means of a movable grid 80 extending through the upper solids interface 82 of the expanded bed. This movable grid is surrounded by a stationary grid 84 to eliminate wall effects. The downward movement of the expanded solids bed around movable grid 80 exerts frictional and gravitational forces which deflect the movable grid downward by an amount inversely proportional to the degree of solids expansion. This downward deflection actuates control instrument 86 and this instrument may be connected as shown in Figure 1, that is to outlet valve 34, or it may be connected to actuate the rate of flow of elutriation gas through expanded bed zone 78 in any other obvious manner.

A superjacent fluidized phase of solids fines 88 is maintained above interface 82 surrounding solids downcomers 72. The elutriation gas and the suspended fines are removed through outlet 90 at a rate controlled by valve 92 and are discarded if desired, or this suspension may be treated as shown in Figure 1 for solids fines recovery.

The elutriated solids collect at the bottom of expanded bed 78 forming again a dense bed of solids 94 below the upper outlet openings of elutriation gas risers 76 and surrounding these and the elutriation gas downcomers 70 and lift line 14. This bed of solids is substantially compact and has the same bulk density as the static bulk density of the solids when at rest. The solids flow downwardly by gravity therethrough and are removed through outlet line 48 at a rate controlled by outlet valve 50.

Thus it is apparent in the elutriation process of this invention that the discharged mass of granular solids to be treated passes downwardly by gravity from a mass of compact solids into an intermediate zone in which the bulk density is reduced by a controlled elutriation gas flow which is insufficient to fluidize or suspend these solids. Only the fine solids are fluidized and removed from the expanded bed. The expanded bed is not a suspension nor is it a turbulent fluidized mass. On the contrary it is esssentially a dense bed of solids having a reduced bulk density. The solids then flow again through a high density phase disposed below the expanded bed of solids. The conveyance fluid is disengaged from the first or upper dense solids phase, is then passed under its own pressure indirectly through the lower dense phase, and then passes at a controlled rate through the intermediate portion of the elutriation zone to form and maintain the expanded bed phase. In this way no separate elutriation fluid is ordinarily required, the granular solids being elutriated are not placed in turbulent suspension form or as a shower whereby the high velocities would otherwise cause increased attrition, and the solids fines already present in the solids are removed therefrom without any substantial formation of additional fines.

The modification shown in Figures 1 and 2 are those in which the separation and elutriation steps are effected in a separate vessel surrounding the upper part of a compact phase solids conveyance. If desired this vessel may comprise the upper portion of a solids-fluid contacting vessel through which the solids are to be passed. This modification may be made by opening up the lower hemispherical head of chamber 16, directly connecting this lower open end to the upper end of the contacting vessel, substituting the lower inclined baffle 74 with a horizontal baffle, and providing a second series of solids downcomers from this second transverse baffle, which are analogous to downcomers 72, and which open into the moving solids bed in the contacting vessel. In such a modification outlet line 48 and valve 50 would be eliminated.

As an example of the solids conveyance and elutriation process of the present invention the following data are given. A 2-inch nominal iron pipe size conveyor 40 feet high was provided with a lower induction zone as shown in Figure 1 and a separator and elutriation zone as detailed in Figure 2. The separator and elutriation zone was 16 inches I.D. and 50 inches high. The upper or transverse horizontal baffle was provided with eight 1-inch downcomers 8 inches long and four conveyor gas downcomers which were 40 inches long. The device was further provided with eight elutriation gas risers disposed in a circle around the lift line and provided with bell caps at their tops analogous to distillation tray bubble caps. The intermediate or expanded bed zone was approximately 16 inches deep at its deepest point and the solids passed therethrough were used cracking catalyst having a nominal mesh size of from about 4 to 8 mesh and containing about 1.5 percent fine solids smaller than about 20 mesh. The solids were passed through this system at a rate of 7500 pounds per hour, the conveyance fluid was flue gas flowing at a rate of 3050 standard cubic feet per hour, all of which was used as the elutriation gas in the elutriation zone. The solids fines were completely removed from the fines laden catalyst fed to the system and no external or separate elutriation gas was necessary.

The process of the present invention is readily applicable to the elutriation of granular solids used in any process in which fine solids are formed and then removed in order to maintain a low or a controllable concentration of solids fines in the mass.

It is to be understood that the conveyance chamber or lift conduit described and illustrated herein are not restricted to flow in any particular direction and horizontal, vertical and directions disposed at angles from the vertical do not interfere with the efficiency nor the operability of the lift line described. Thus the conveyance conduit in which granular solids are transferred in compact form at their static bulk density may be used for lifting of solids, the transfer of solids over relatively long horizontal distances or a combination of the two in which a lateral as well as a vertical transfer are simultaneous.

It is also to be understood that the conveyance and elutriation fluids described in conjunction with this invention may be either liquid or gaseous. Preferably when the solids are being contacted with a liquid in a contact treating process the solids are conveyed and elutriated by means of liquid conveyance fluids. When a vapor or gas is contacted with a moving mass of solids desirably gaseous fluids are used for conveyance and elutriation. This does not, however, preclude the use of liquid or gaseous conveyance and elutriation fluids with gaseous or liquid contact processes, respectively. The use of liquid conveyance media simplifies somewhat the design and construction of the conveyance conduit or lift line conduit because with depressuring liquids the degree of volume expansion and velocity increases accompanying the depressuring are negligible, while they are appreciable with gaseous fluids. When a gaseous conveyance fluid is depressured by an amount which is a substantial fraction, i.e., more than about 10 percent, of the absolute operating pressure, the lift gas expansion effects are appreciable and steps should be taken to insure the maintenance throughout the lift line of a substantially constant solids flow criterion given by the following equation:

$$\frac{\frac{dp}{dl}}{\rho_s \cos \theta}$$

in which $$\frac{dp}{dl}$$

is the pressure differential per unit length of the lift line, $\rho_s$ is the bulk density of the solids being transferred, and $\theta$ is the angular deviation of the conveyance direction from a vertical upward reference axis. This criterion may be maintained substantially constant by providing a conveyance conduit whose cross sectional area increases in the direction of flow, by removing a small portion of the lift gas at successive points along the length of the conveyance chamber, or both, or by other means. When liquid conveyance fluids are used cylindrical lift lines may be used without consideration for expansion effects. Thus when appreciable high pressure drops exist in a given conveyance chamber such as in those cases where the distance over which the solids must be passed is great, the use of liquid conveyance fluids is dictated since a conveyance line of uniform diameter may be employed.

The quantity of conveyance fluid per unit required to convey a unit weight of granular solids is considerably less than that required with the conventional suspension type of conveyors in which the gas is employed to suspend or aerate the solid material. In those types of conveyors between 5 and about 15 standard cubic feet of gas are required for a single pound of granular solids, varying somewhat according to size of the solid particles and the density of the particles and the conveyance gas. In the present conveyance apparatus, however, requirements are reduced to between about 0.2 and 1.0 standard cubic feet per pound of solids. Whereas, lift gas velocities of from 10 to 40 feet per second and higher are required with the suspension type of conveyors, lift gas velocities in the present operation may be maintained at between about 0.5 to as high as 10 feet per second with a more preferable range between about 1 and 4 feet per second. It is highly important to emphasize that the condition of the granular solids while being conveyed through the conveyance chamber or lift line conduit of this apparatus is such that the granular solids exist as a moving mass of substantially compact unaerated granular solids having substantially the same bulk density during conveyance as the static bulk density of the granular solids when aerated and at rest. The solids move in what is termed "plug type flow" through the conveyance chamber and they are not aerated nor suspended in a lift gas.

In the present specification the term "substantially compact in fluidized form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% *) and the greatest bulk density (about 41.5% greater) when uniformly packed with particle centers coinciding with the apexes of a tetrahedron (rhombohedral packing — pore volume 25.95% *). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20 percent of the at-rest vibrational packed value and usually the decrease does not exceed about 5 percent of this value.

To illustrate the magnitude of the solids bulk density variation the following data are given typical of an operation for conveying compact solids:

Conduit height, feet _____ 27.25
Conduit attitude _____ Vertical
Conduit diameter, inches:
    Inlet _____ 3.068
    Outlet _____ 4.000
Conveyance fluid _____ Air
Solids mesh size _____ 4–10
Solids flow rate, lb./hr. _____ 4,500
Solids vibrational bulk density lb./cu. ft. __ 46.7

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85 percent decrease from the static value and in most cases the decrease is less than 2 percent.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10 percent increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10 percent increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance ---
* Micromeritics—J M Dalla Valle (1943), p. 105.

of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20 percent of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase their size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20 percent less than the static vibrational bulk density, or if there is an increase in pressure differential with increase in fluid flow rate, or if the conveyance force ratio is greater than 1.0.

Each solid particle is continuously in direct contact with several other particles surrounding it and is not free to move relative to them, thus differentiating from those conveyance operations in which the solids are aerated, fluidized or otherwise suspended in a fluid and have operating bulk densities always considerably less than 80 percent of the vibrational or static bulk density.

The solids to inner conduit wall angle of repose $\alpha°$ is defined as the maximum inclination (with respect to a horizontal plane of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

This application is a continuation in part of copending application Serial No. 137,406, now U.S. Patent No. 2,743,814, issued May 1, 1956.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:
1. An apparatus for the conveyance of compact granular solids and the elutriation of solids fines therefrom, which comprises an induction chamber, inlet means for maintaining the solids as an accumulation therein, means for introducing a conveyance fluid thereinto, an eduction chamber with a transverse divider partitioning said eduction chamber into an upper separation chamber and a lower elutriation chamber, a lower transverse baffle near the bottom of said elutriation chamber, an elongated conveyance conduit connecting a low point in said induction chamber with said separation chamber, means for applying a force against solids discharging from the outlet of said elongated conveyance conduit, at least one solids downcomer opening from the bottom of said separation chamber and terminating downwardly at an intermediate point in said elutriation chamber, at least one fluid downcomer connecting said separation chamber at a point intermediate therein with a point below said lower baffle, at least one elutriation fluid riser opening upwardly from below said lower baffle to a point below said intermediate point in said elutriation chamber, a solids outlet conduit opening from the bottom of said elutriation chamber, and a fines outlet conduit for fluid and solids fines opening from the upper part of said elutriation chamber.

2. An apparatus according to claim 1 in combination with valve means opening from the top of said separation chamber, a movable grid structure disposed in said elutriation chamber so as to extend through the upper level of an expanded bed of solids therein below said intermediate point, and an instrument responsive to vertical deflections of said grid and connected to actuate said valve means and thereby control the rate of flow of fluid upwardly through said fluid riser.

3. An apparatus for the separation of solids fines from a moving bed of granular solids which comprises a closed vessel, a transverse divider in the upper part thereof forming a separation chamber above said divider, a lower transverse baffle in the lower part of said vessel forming an elutriation chamber between said divider and said baffle, a conveyance conduit opening into said separation chamber, means for applying a force against solids discharging from the outlet of said conveyance conduit, at least one solids downcomer opening from the bottom of said separation chamber and terminating downwardly at an intermediate point in said elutriation chamber, at least one fluid conduit connecting said separation chamber at a point intermediate therein with a point below said lower baffle, at least one fluid riser conduit opening from a point below said lower baffle upwardly through said lower baffle and terminating below said intermediate point in said elutriation chamber, a fines outlet conduit for fluid and solids fines opening from the upper part of said elutriation chamber, a solids outlet conduit opening downwardly from the bottom of said elutriation chamber, and means for controlling the rate of solids removal through said solids outlet conduit.

4. An apparatus according to claim 1 in combination with controllable means for by-passing unelutriated solids directly from said separation chamber to the solids outlet from said elutriation chamber whereby only part of said solids are elutriated.

5. An apparatus according to claim 3 wherein a plurality of said solids downcomers are arranged uniformly throughout the cross section of said transverse divider, and a plurality of said fluid risers are arranged uniformly throughout the cross section of said lower baffle, each of said risers being surmounted by a cap adapted to prevent solids flow downwardly into and through said risers.

6. An apparatus according to claim 3 wherein a plurality of fluid conduits are arranged vertically within said vessel and have their upper inlet openings adjacent the roof and their lower outlet openings adjacent the bottom thereof.

7. An apparatus according to claim 3 in combination with a fluid outlet opening from said separator chamber, and means for controlling the fluid flow therethrough.

8. An apparatus according to claim 3 in combination with an inlet conduit for auxiliary elutriation fluid opening into said vessel at a point below said lower baffle.

9. An apparatus for the separation of solids fines from a moving bed of granular solids which comprises an upper solids-receiving and gas-separation chamber, a lower solids elutriation chamber bounded at its lower extremity by a sloping baffle for solids withdrawal, a solids conveyance conduit opening into said separation chamber, means for restricting the flow of solids from the outlet of said conveyance conduit, a conduit communicating the bottom of said separation chamber with a solids-delivery point located in the intermediate zone of said elutriation chamber and adapted to deliver solids by gravity flow from said separation chamber to said solids-delivery point, a second conduit opening from an intermediate point in said separation chamber and extending downwardly and then upwardly through said baffle and terminating at a gas-delivery point below said solids-delivery point in the elutriation chamber thereby providing a path for the flow of gas from said separation chamber to said gas-delivery point, an outlet conduit for solids opening downwardly from the bottom of said elutriation chamber, and an outlet conduit for fluid and solids fines opening from the upper part of said elutriation chamber.

References Cited in the file of this patent

UNITED STATES PATENTS

| | | |
|---|---|---|
| 2,014,291 | Reed | Sept. 10, 1935 |
| 2,132,961 | Morgan | Oct. 11, 1938 |
| 2,268,535 | Schutte | Dec. 30, 1941 |
| 2,393,636 | Johnson | Jan. 29, 1946 |
| 2,446,247 | Scheineman | Aug. 3, 1948 |
| 2,459,056 | Watson | Jan. 11, 1949 |
| 2,567,207 | Hoge | Sept. 11, 1951 |
| 2,621,034 | Stecker | Dec. 9, 1952 |
| 2,643,161 | Shirk | June 23, 1953 |
| 2,661,321 | Schutte | Dec. 1, 1953 |
| 2,666,526 | Odell | Jan. 19, 1954 |
| 2,743,814 | Berg | May 1, 1956 |

OTHER REFERENCES

Houdriflow: New Design in Catalytic Cracking, Oil and Gas Journal, Jan. 13, 1949, volume 47, pages 78–79.